United States Patent [19]
Chou et al.

[11] Patent Number: 5,102,639
[45] Date of Patent: Apr. 7, 1992

[54] PRASEODYMIUM-PALLADIUM BINARY OXIDE, CATALYST COMPOSITIONS CONTAINING THE SAME, AND METHODS OF USE

[75] Inventors: Ting C. Chou, San Jose, Calif.; Teresa Kennelly, Belle Mead; Robert J. Farrauto, Westfield, both of N.J.

[73] Assignee: Engelhard Corporation, Iselin, N.J.

[21] Appl. No.: 684,631

[22] Filed: Apr. 12, 1991

[51] Int. Cl.$^5$ .............................................. C01F 17/00
[52] U.S. Cl. .................................. 423/263; 423/593; 502/302
[58] Field of Search ............... 423/263, 593; 502/302, 502/326; 501/126

[56] References Cited

U.S. PATENT DOCUMENTS

| | | | |
|---|---|---|---|
| 3,294,701 | 12/1966 | Vogel et al. | 423/263 |
| 4,266,978 | 5/1981 | Prochazka | 423/593 |
| 4,273,945 | 6/1981 | Heilen et al. | 502/302 |

FOREIGN PATENT DOCUMENTS

| | | | |
|---|---|---|---|
| 60-244339 | 12/1985 | Japan | 502/302 |
| 63-88041 | 4/1988 | Japan | 502/302 |
| 64-30647 | 2/1989 | Japan | 502/302 |

Primary Examiner—R. Bruce Breneman

[57] ABSTRACT

A novel praseodymium-palladium oxide compound has the formula $Pr_4PdO_7$. The compound has utility as a catalyst for oxidation of combustion mixtures comprising oxygen (e.g., air) and gaseous carbonaceous fuels such as methane and displays excellent regeneration characteristics after exposure to decomposition-causing temperatures. The compound may be used in a catalyst composition by being coated as a washcoat on a suitable carrier. Catalytic combustion processes are carried out by contacting such combustion mixture with the catalyst under combustion conditions, including catalytically supported thermal combustion. Regeneration of over-temperatured catalyst is also provided for.

10 Claims, 10 Drawing Sheets

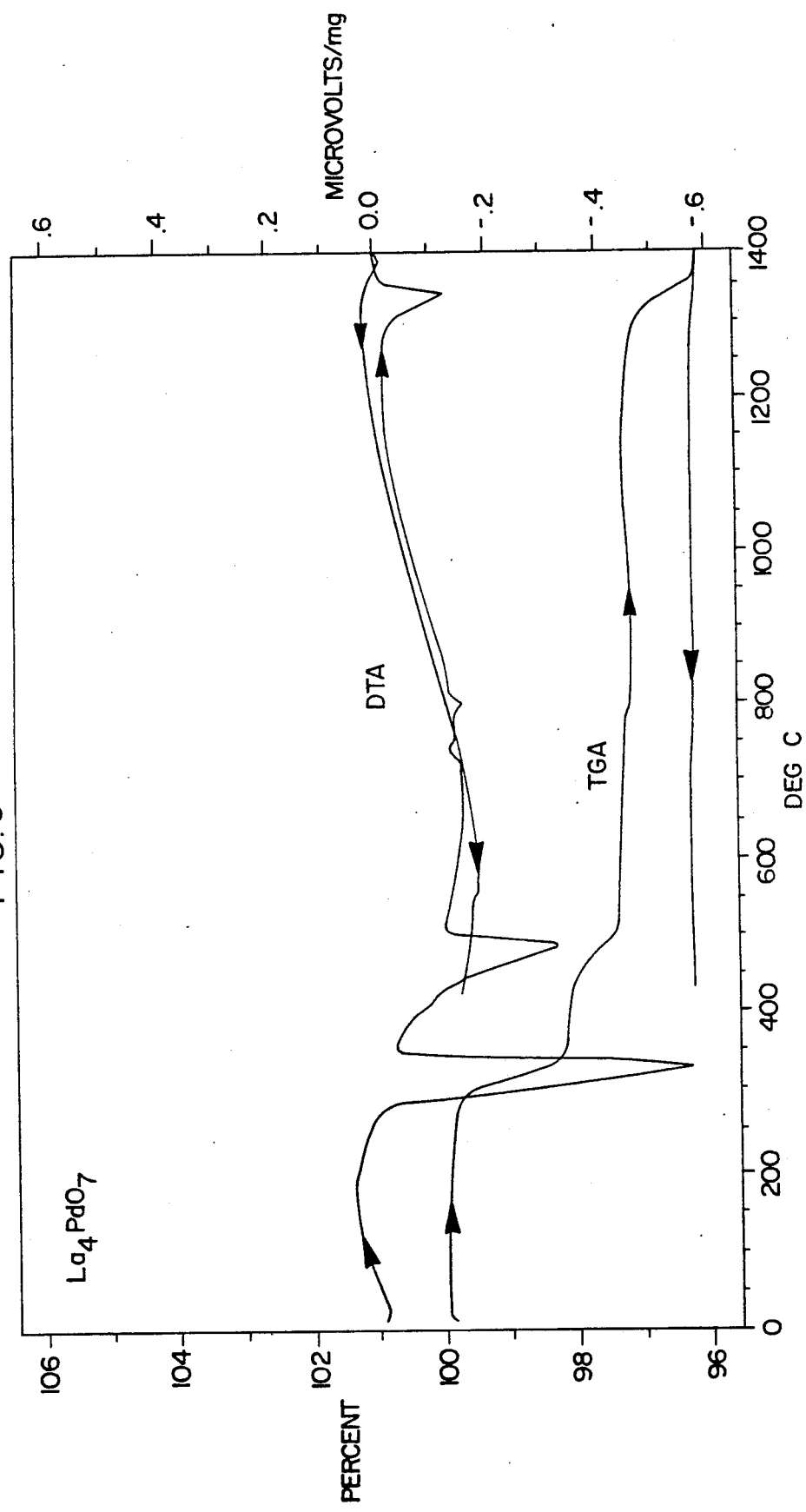

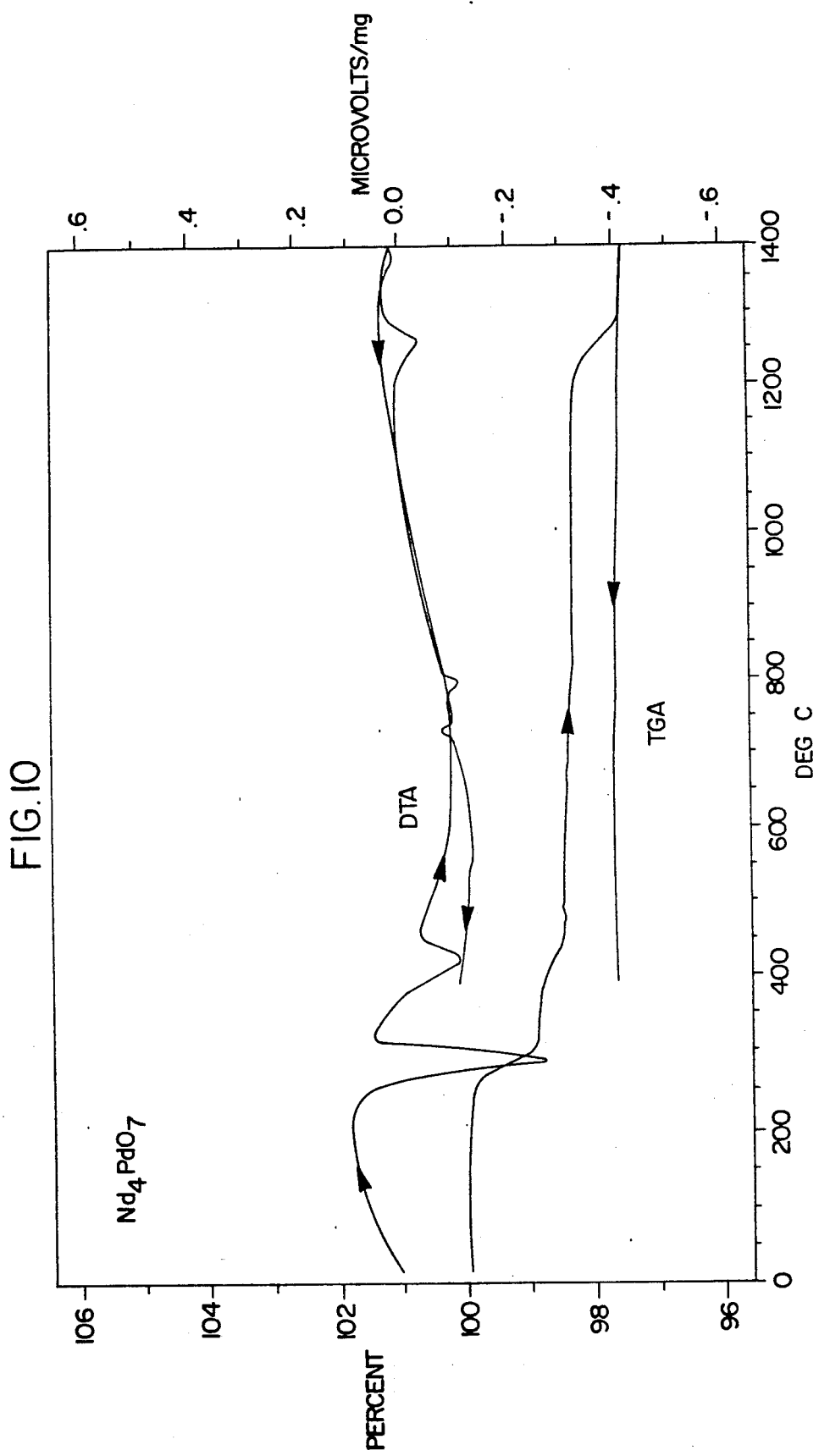

PRASEODYMIUM-PALLADIUM BINARY OXIDE, CATALYST COMPOSITIONS CONTAINING THE SAME, AND METHODS OF USE

BACKGROUND OF THE INVENTION

1. Field of the Invention

The present invention relates to a novel binary oxide of praseodymium and palladium which has utility as a catalyst suitable for the combustion of gaseous carbonaceous fuels such as natural gas or methane, to a catalyst composition containing the same, and to a process for catalytic combustion of such carbonaceous fuels using the novel compound as a catalyst for the combustion.

2. Related Art

Complexes of palladium oxide and rare earth metal sesquioxides are known, as shown by an article by C. L. McDaniel et al, "Phase Relations Between Palladium Oxide and the Rare Earth Sesquioxides in Air", *Journal of Research of the Natural Bureau of Standards—A. Physics and Chemistry*, Vol. 72A, No. 1, January-February, 1968. Pages 27-37 describe complexes of PdO and rare earth metal oxides. Specifically, the paper describes the study of equilibrium phase relations in an air environment between PdO and each of the following sesquioxides: $Nd_2O_3$, $Sm_2O_3$, $La_2O_3$, $Eu_2O_3$, $Gd_2O_3$, $Dy_2O_3$, $Ho_2O_3$, $Y_2O_3$, $Er_2O_3$, $Tm_2O_3$, $Yb_2O_3$ and $Lu_2O_3$. The experimental procedure employed is described in section 3 at page 28 and describes mixing various combinations of PdO and the rare earth metal oxides and subjecting the mixture to preliminary heat treatments for a minimum of 18 hours at 770° C. and then at 780° C. After each heat treatment the materials were examined by x-ray diffraction techniques and following the preliminary heat treatments portions of each batch were fired at various temperatures, typically lying between 1000° C. and 3000° C. as set forth in TABLE I, pages 29-33. Among other findings, the paper notes (in the summary of section 4.3 at page 34) the dissociation temperature of PdO in air at atmospheric pressure to be 800° C.±5° C., and that palladium oxide reacts with a number of the rare earth metal oxides to form binary compounds. What is described as the pseudobinary system $Nd_2O_3 \cdot PdO$ is said to exemplify the typical type of reaction and three binary oxide compounds of, respectively, 2:1, 1:1 and 1:2 molar ratios of $Nd_2O_3:PdO$ are disclosed, viz, $2Nd_2O_3 \cdot PdO$; $Nd_2O_3 \cdot PdO$ and $Nd_2O_3 \cdot 2PdO$. (The compound $2Nd_2O_3 \cdot PdO$ may of course be written as $Nd_4PdO_7$.) Analog compounds are noted for the $Sm_2O_3 \cdot PdO$, $Eu_2O_3 \cdot PdO$ and $La_2O_3 \cdot PdO$ systems, with only the 2:1 and 1:2 compounds occurring in the latter system. However, it was noted that other rare earth oxide-palladium oxide combinations did not react in the solid state. There were combinations of PdO with, respectively, $Ho_2O_3$, $Y_2O_3$, $Er_2O_3$, $Tm_2O_3$, $Yb_2O_3$ and $Lu_2O_3$. (See the Abstract at page 27, and the last sentence on page 35.)

Another article, by A. Kato et al, "Lanthanide B-Alumina Supports For Catalytic Combustion Above 1000° C.", *Successful Design of Catalysts*, 1988 Elsevier Science Publishers, pages 27-32, describes the preparation of support materials consisting of lanthanide oxides and alumina for use as combustion catalysts. The article states that endurance tests on methane combustion performed at 1200° C. proved that a Pd catalyst supported on lanthanum B-alumina has good resistance to thermal sintering (page 32).

U.S. Pat. No. 4,893,465 issued to Robert J. Farrauto et al describes a process for the catalytic combustion of carbonaceous materials, such as natural gas or methane, using a palladium oxide containing catalyst. In the process, the palladium oxide catalyst for the catalytic combustion is subjected to temperatures in excess of the decomposition temperature of palladium oxide to metallic palladium, the latter being inactive for catalysis of the combustion reaction. At atmospheric pressure the decomposition temperature of PdO is at least about 800° C. The stated improvement in the process of the Patent comprises restoring catalytic activity by lowering the temperature of the catalyst to a regenerating temperature, i.e., a temperature at which Pd is oxidized to PdO, which in air at atmospheric pressure is from about 530° C. to about 650° C., and maintaining the temperature within that range until desired catalytic activity is achieved by reoxidation of inactive Pd to PdO. The examples of the Patent utilize $PdO/Al_2O_3$ as the catalyst.

SUMMARY OF THE INVENTION

In accordance with the present invention there is provided a compound of the formula $Pr_4PdO_7$.

One aspect of the present invention provides a catalyst composition comprising a refractory carrier on which is disposed a catalytic material comprising a mixture of a refractory inorganic binder, e.g., one or more of silica, alumina, titania and zirconia, and a catalytically effective amount of a binary oxide having the formula $Pr_4PdO_7$.

In another aspect of the invention the binary oxide compound is contained in a reaction product obtained by heating a mixture of praseodymium oxide and palladium oxide to an elevated temperature and for a time sufficient to react the oxides to form the compound.

Yet another aspect of the invention provides that the catalytic material comprises a mixture of a refractory inorganic binder and a catalytically effective amount of a reaction product obtained by heating a mixture of praseodymium oxide and palladium oxide to an elevated temperature for a time sufficient to react the oxides to form a binary oxide of praseodymium and palladium.

A process aspect of the invention provides a process for the catalytically supported combustion of a gaseous carbonaceous fuel. The process comprises the steps of forming a gaseous combustion mixture comprising the fuel and oxygen, for example, a mixture of natural gas or methane and air, and contacting the combustion mixture in a catalyst zone with a catalyst composition. The catalyst composition comprises a refractory carrier on which is disposed a catalytic material comprising a mixture of a refractory inorganic binder and a catalytically effective amount of a binary oxide of praseodymium and palladium. The contacting is carried out under conditions, e.g., a temperature of from about 925° C. to 1650° C. and a pressure of from about 1 to 20 atmospheres in the catalyst zone, which are suitable for catalyzed combustion of the combustion mixture. Sustained combustion of at least a portion of the fuel in the mixture is thereby effected without substantial formation of oxides of nitrogen. A narrower range of suitable combustion conditions may be maintained in the catalyst zone, for example, a temperature of from about 1000° C. to 1500° C. and a pressure of from about 1 to 15 atmospheres.

In one aspect of the invention, the catalyzed combustion is carried out under substantially adiabatic conditions at a reaction rate exceeding the mass transfer rate of gaseous fuel and oxygen to the catalyst to attain catalytically supported thermal combustion of at least a portion of the fuel in the combustion mixture.

Yet another aspect of the present invention provides a process for regenerating a catalyst composition comprising a refractory carrier on which is disposed a catalytic material comprising a mixture of (i) a refractory inorganic binder and (ii) a catalytically effective amount of a binary oxide of praseodymium and palladium having the formula $Pr_4PdO_7$ and which has sustained deactivation caused by being heated to a temperature above its deactivation temperature. The regeneration comprises heating the catalyst composition in the presence of an oxygen-containing gas, e.g., air, at a regeneration temperature below about 1200° C., e.g., at a temperature in the range of from about 600° C. to 1200° C. The regeneration process, which may be low temperature combustion process, may be conducted in conjunction with and subsequent to the normal higher temperature range combustion process.

Other aspects of the invention are described below.

BRIEF DESCRIPTION OF THE DRAWINGS

FIGS. 1, 2 and 3 show, respectively, the XRD spectra of reaction products containing the novel compound of the present invention obtained by using a dry-mixed oxide method to react, respectively, 1:1, 4:1 and 2:1 atomic ratios of Pr to Pd as mixtures of mixed praseodymium oxides and palladium oxide;

FIG. 4 shows as a reference the XRD spectra of the aforesaid mixed praseodymium oxide powder starting material;

FIGS. 5 and 6 show the XRD spectra of reaction products containing the novel compounds of the invention obtained by a solution-drying method;

FIG. 7 compares the XRD spectra of the compounds $La_4PdO_7$, $Nd_4PdO_7$ and $Pr_4PdO_7$, the binary praseodymium-palladium oxide compound of the present invention;

FIGS. 9 and 10 are plots corresponding to FIG. 8 for, respectively, the known compounds $La_4PdO_7$ and $Nd_4PdO_7$.

DETAILED DESCRIPTION OF THE INVENTION AND PREFERRED EMBODIMENTS THEREOF

Figure 1:
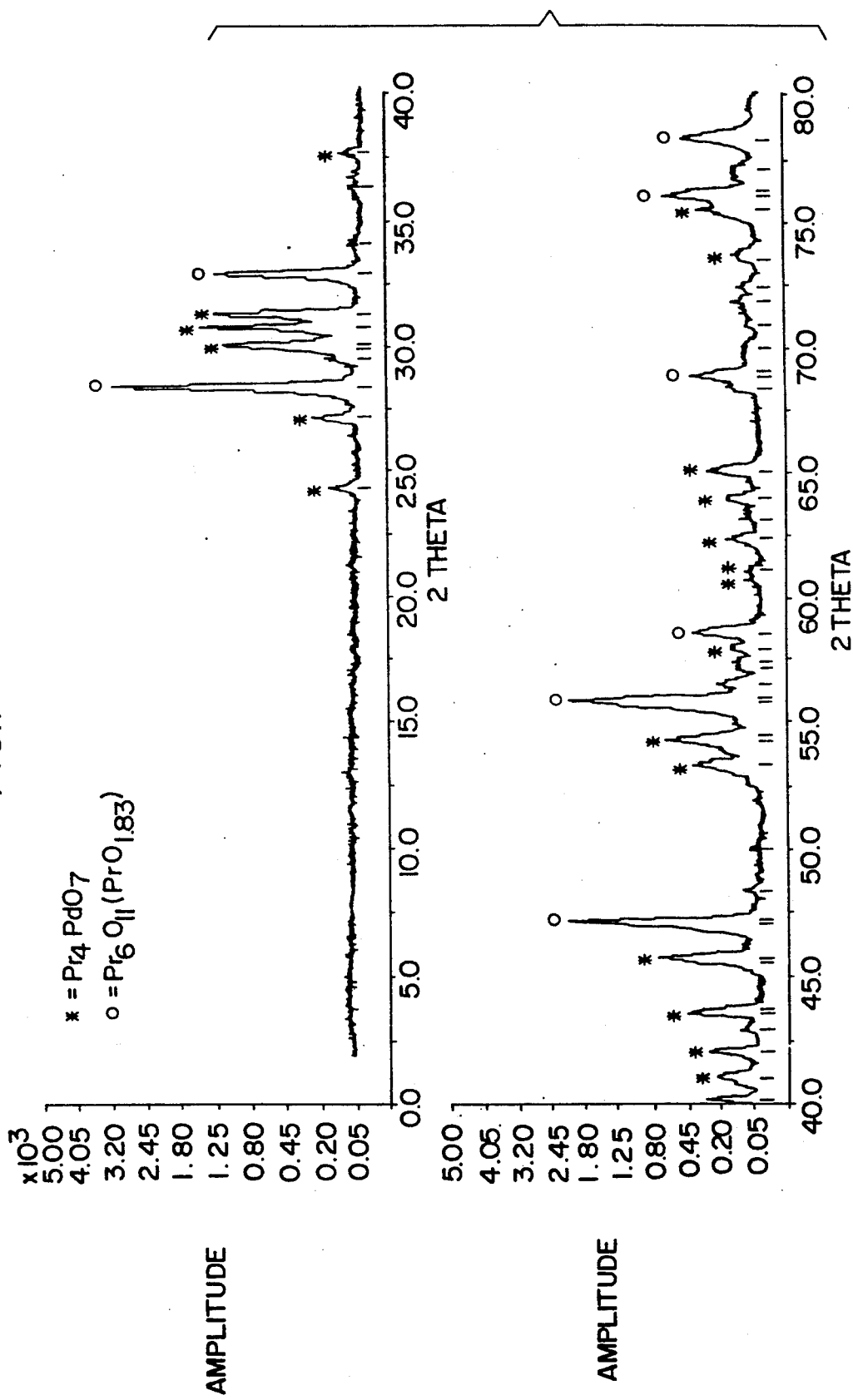
FIGS. 1 through 7 are x-ray diffraction spectra ("XRD spectra") of the following materials.

The compound of the present invention finds utility as a catalyst for combustion of gaseous carbonaceous fuels such as natural gas, methane or other such fuels. Other suitable fuels include ethane, propane, butane, other hydrocarbons, alcohols, other carbonaceous materials and mixtures thereof. The compound of the present invention, like other binary oxides of palladium and rare earth metals, decomposes at elevated temperatures to form catalytically inactive species. However, the praseodymium-palladium oxide of the present invention demonstrates a striking ability to be regenerated into the catalytically active species, by exposure to an oxygen-containing gas at temperatures just a few hundred degrees centigrade below its inactivation temperature. This stands in stark constrast to the very limited regenerative characteristics of the analogous lanthanum-palladium and neodymium-palladium binary oxides. The latter two compounds show catalytic activity for catalytic combustion of gaseous carbonaceous fuels comparable to that of the praseodymium-palladium oxide, but no significant regenerative characteristics as compared to the praseodymium-palladium compound.

The compound of the invention may be prepared by either a dry mixed-oxide method or a solution-drying method. In the dry mixed-oxide method a mixture of a praseodymium oxide power containing $Pr_2O_3$ and PdO powder was mixed in Pr to Pd atomic ratios of, for example, 1:1, 4:1 and 2:1. The mixed powders were mechanically ground together to a size range of about 50 to 100 micron diameter particles. The grinding was followed by calcination at about 1100° C. in air for about 18 hours to provide a reaction mixture containing the compound of the invention. In the solution-drying method, suitable amounts of praseodymium nitrate hexahydrate, $Pr(NO_3)_2 \cdot 6H_2O$, and palladium nitrate, $Pd(NO_3)_2 \cdot 2H_2O$, were mixed in an aqueous solution at temperatures of between about 60° C. and 90° C., heated to evaporate to dryness, and the resulting residue was calcined in air at about 1100° C. for about 18 hours to provide a reaction mixture containing the compound of the invention. The presence in the reaction mixture of the binary praseodymium-palladium oxide compound of the present invention having the formula $Pr_4PdO_7$, was indicated by x-ray diffraction analysis.

The following illustrative Examples 1 and 2 demonstrate the preparation of the compound of the present invention by the dry mixed-oxide method.

EXAMPLE 1

A mixture of 2.5 grams ("g") of palladium oxide and 3.4 g of praseodymium oxide was ground in a mortar and pestle, to give a ground mixture having an atomic ratio of 2 Pr to 1 Pd. The palladium oxide powder was a commercially available material available from Engelhard Corporation and comprised about 86 weight percent Pd, balance oxygen. The praseodymium oxide powder was a commercially available material available from Aldrich Chemical Company who reports a composition of 82.7 weight percent Pr, balance oxygen. The praseodymium oxide is a mixture of various oxides such as $PrO_2$ and $Pr_6O_{11}$. The ground material was calcined in air at 780° C. for 17 hours, reground and calcined in air for an additional 65 hours at 1100° C. The resulting material was subjected to x-ray diffraction analysis as described below, showing the presence of a compound of the formula $Pr_4PdO_7$ as well as traces of $PrO_2$, $Pr_6O_{11}$, PdO and Pd.

EXAMPLE 2

A. The procedure of Example 1 was repeated except that 1 g of palladium oxide and 5.4 g of the praseodymium oxide starting powder were used, giving an atomic ratio of 4 Pr to 1 Pd in the mixture. The resulting material was subjected to x-ray diffraction analysis as described below, showing the presence of a compound of the formula $Pr_4PdO_7$ as well as traces of $PrO_2$, $Pr_6O_{11}$, PdO and Pd.

B. The same procedure as used in Part A of this Example 2 was used to prepare a sample except that the ratio of palladium oxide and praseodymium oxide was altered to give an atomic ratio of 2 Pr to 1 Pd. The resulting sample was tested to generate the XRD spectra of FIG. 3.

The following illustrative Examples 3 and 4 demonstrate preparation of the compound of the present invention by the solution-drying method.

EXAMPLE 3

2 moles of $Pr(NO_3)_3.6H_2O$ crystals (obtained from Aldrich Chemical Company) were added to an aqueous solution in which there was dissolved 1 mole of $Pd(NO_3)_2.2H_2O$ (provided by Engelhard Corporation) and thoroughly mixed until all the praseodymium nitrate crystals dissolved. The reaction mixture had an atomic ratio of 2 Pr to 1 Pd. The solution was heated at 90° C. to dryness and the dried residue was calcined in air at 1100° C. for 65 hours. The resulting material was subjected to x-ray diffraction analysis as described below, showing the presence of a compound of the formula $Pr_4PdO_7$ as well as traces of $PrO_2$, $Pr_6O_{11}$, PdO and Pd.

EXAMPLE 4

The procedure of Example 3 was repeated except that 4 moles of $Pr(NO_3)_3.6H_2O$ crystals were added to an aqueous solution in which 1 mole of $Pd(NO_3)_2.2H_2O$ was dissolved. The reaction mixture had an atomic ratio of 4 Pr to 1 Pd.

Figure 2:
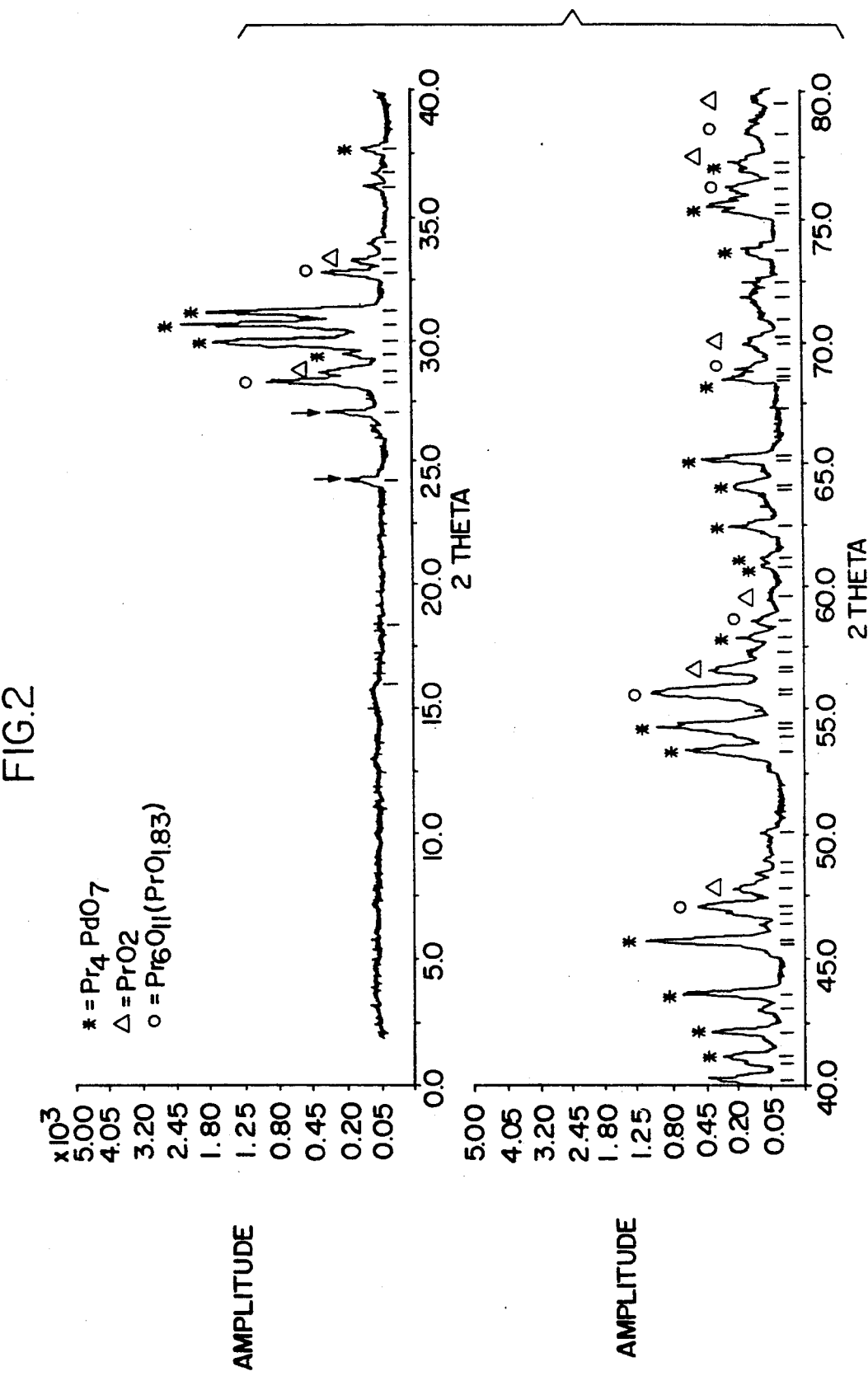
Figure 3:
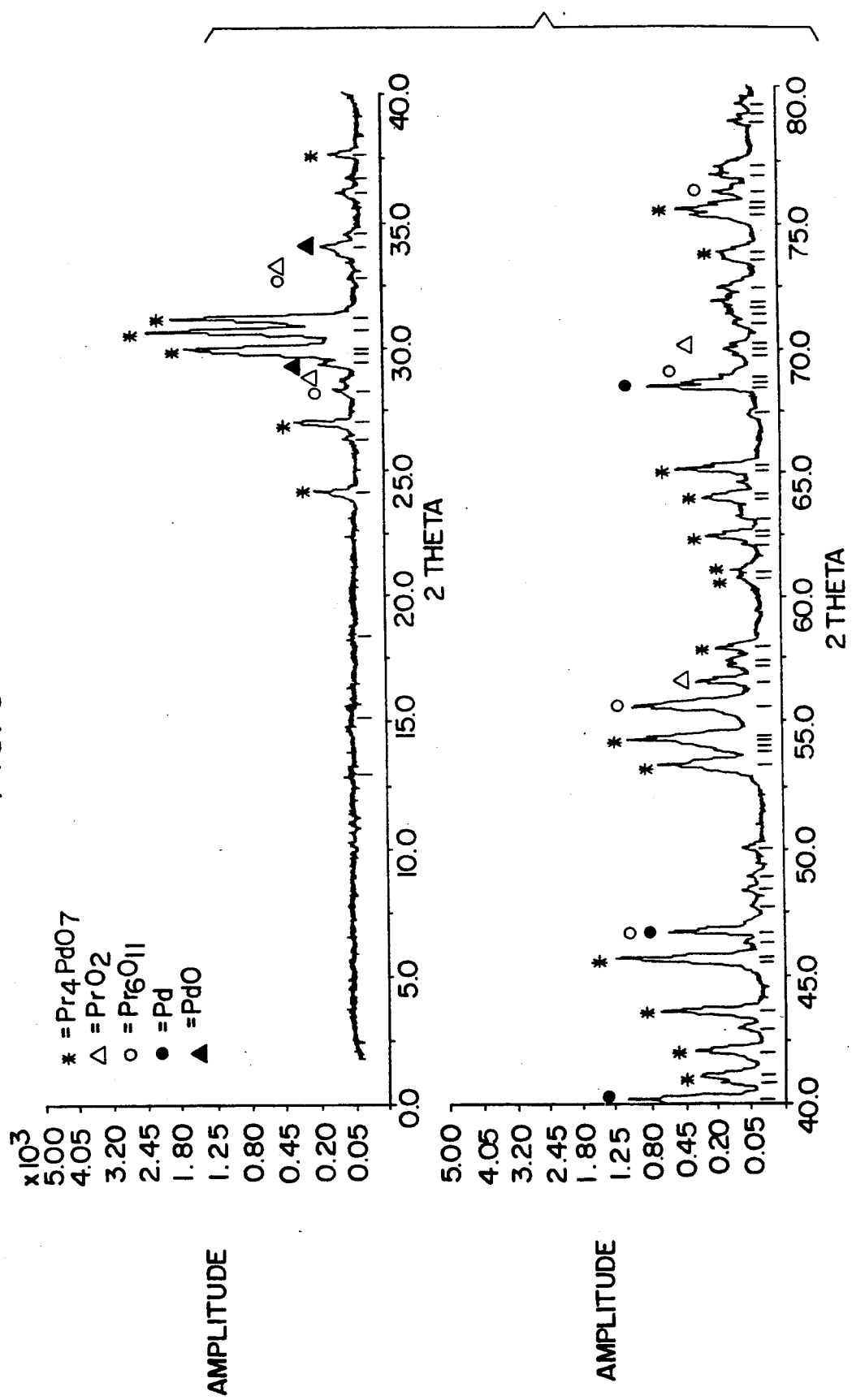
Figure 4:
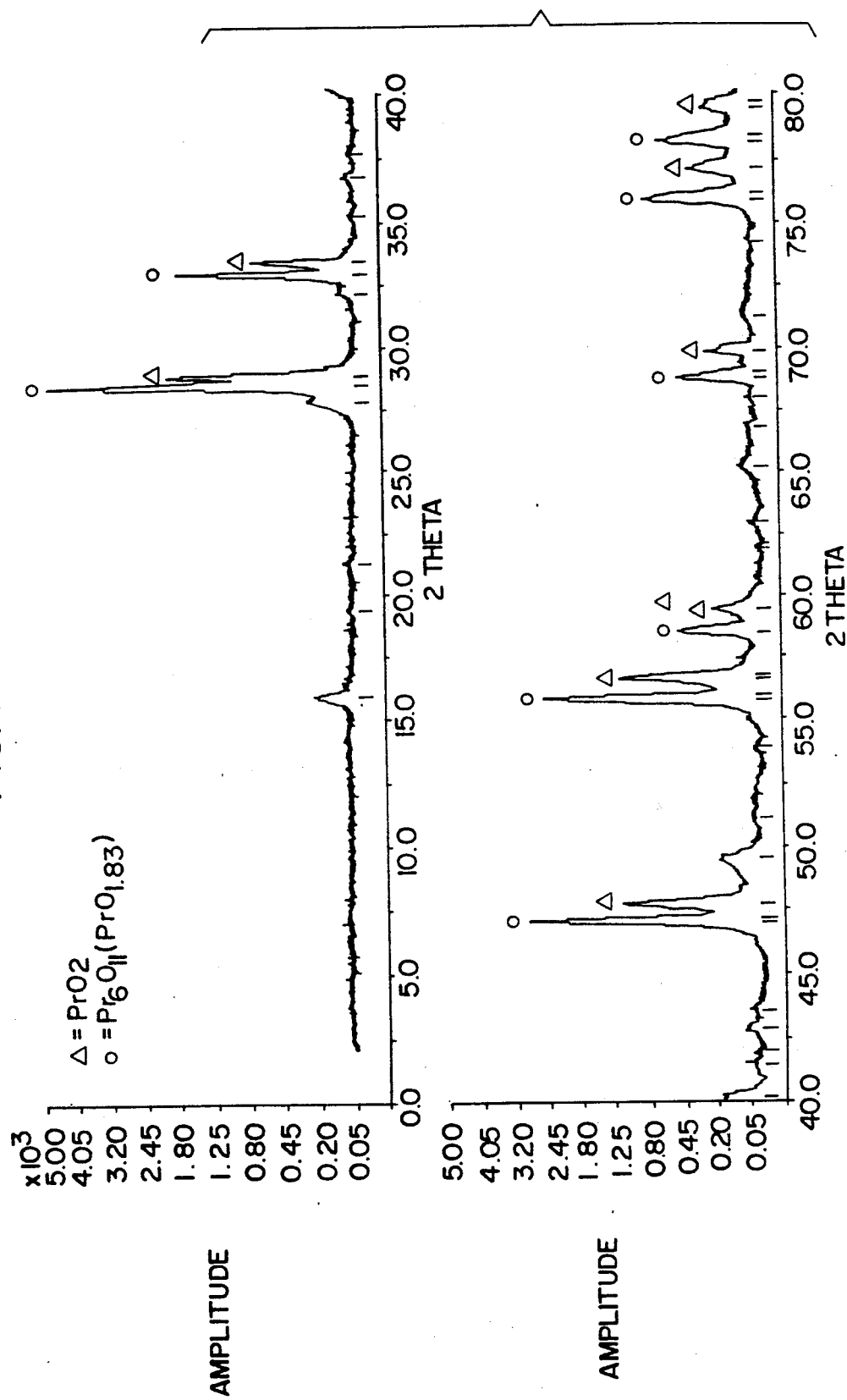

The reaction products obtained in Examples 1-4 were subjected to x-ray diffraction analysis. The x-ray diffraction ("XRD") spectra were generated with Cu K-alpha radiation by standard powder procedures using a Phillips APD 3720 Diffractometer System at a step scan of 0.02 degrees 2 theta and a count time of one second per step to examine the reaction products of, respectively, Examples 1, 2, 3 and 4. According to the XRD spectra results, the compound $Pr_4PdO_7$ was formed by the dry mixed-oxide method employed in Examples 1 and 2 and the solution-drying method of Examples 3 and 4. The XRD analysis shows the presence of the new compound in addition to small amounts of the residual starting materials, i.e., $PrO_2$, $Pr_6O_{11}$ (equivalent to $PrO_{1.83}$), PdO and Pd. The formation of the new compound is found to be independent of the mixing ratios between the palladium oxide and praseodymium oxide powders. FIGS. 1 to 3 show the XRD spectra of the calcined reaction product made by the dry mixed-oxide method of Examples 1 and 2 and based on, respectively, 1:1, 4:1 and 2:1 atomic ratios of Pr to Pd. As a reference, the XRD spectra of the praseodymium oxide starting material powder is shown in FIG. 4, from which it is clear that the starting praseodymium oxide powder contains both $PrO_2$ and $Pr_6O_{11}$ ($PrO_{1.83}$).

In FIG. 1 the XRD spectra peaks of the reaction product obtained by calcining the mixed, ground praseodymium oxide/palladium oxide 4 Pr to 1 Pd atomic ratio powder show that the $PrO_2$ species was consumed completely during the solid state reactions, and converted into the new compound $Pr_4PdO_7$, while a majority of the $Pr_6O_{11}$ ($PrO_{1.83}$) species survived. It is believed that the $PrO_2$ is much more reactive with PdO than is the $Pr_6O_{11}$. As the atomic ratio of Pr to Pd decreases to 1:1 (see FIG. 1), the amount of the unreacted $Pr_6O_{11}$ decreases while the amount of the metallic Pd (which originated from the decomposition of the PdO at high temperatures) increases. The peaks characteristic of the compound $Pr_4PdO_7$ are marked in FIGS. 1-3 by asterisks.

Figure 5:
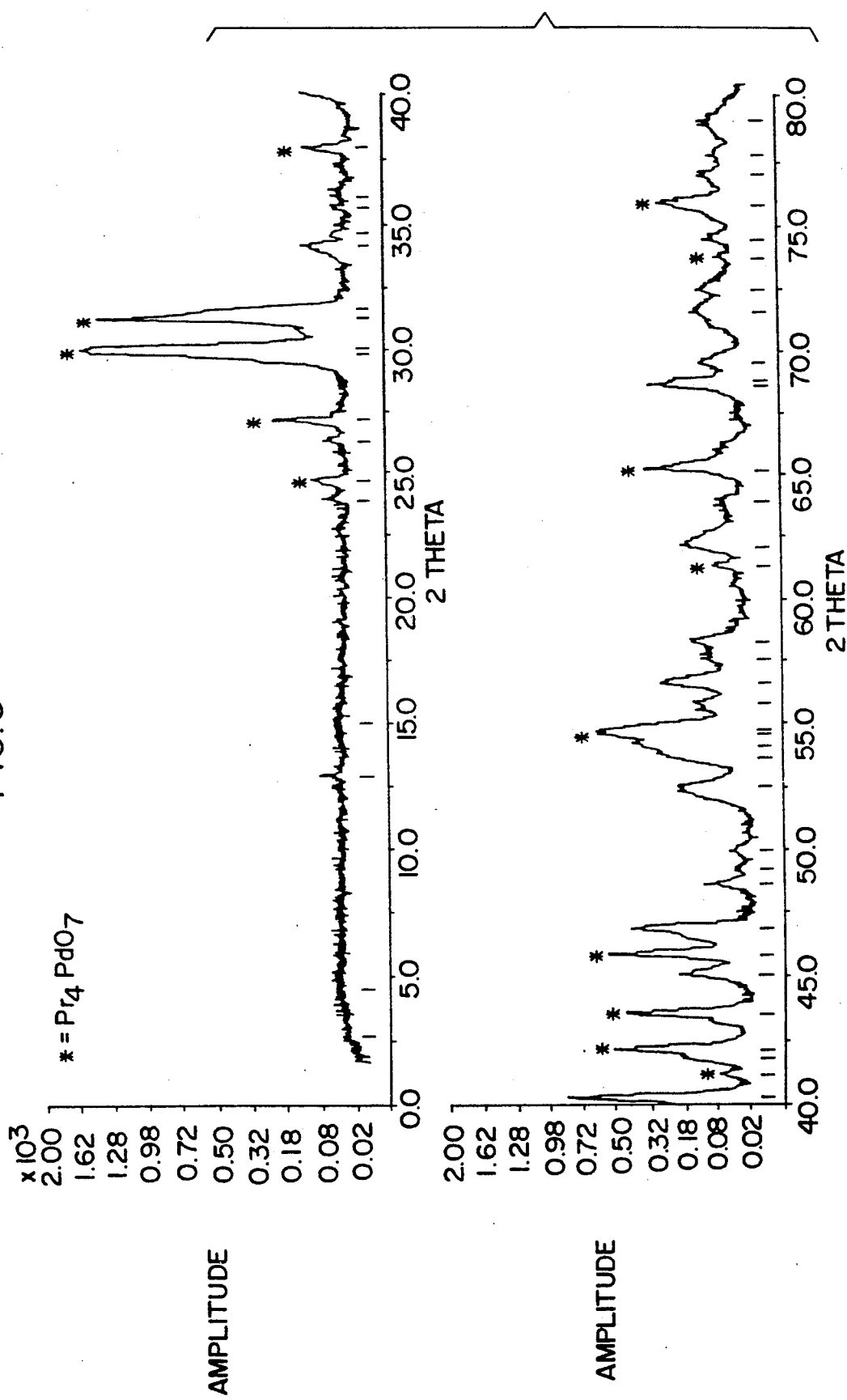
Figure 6:
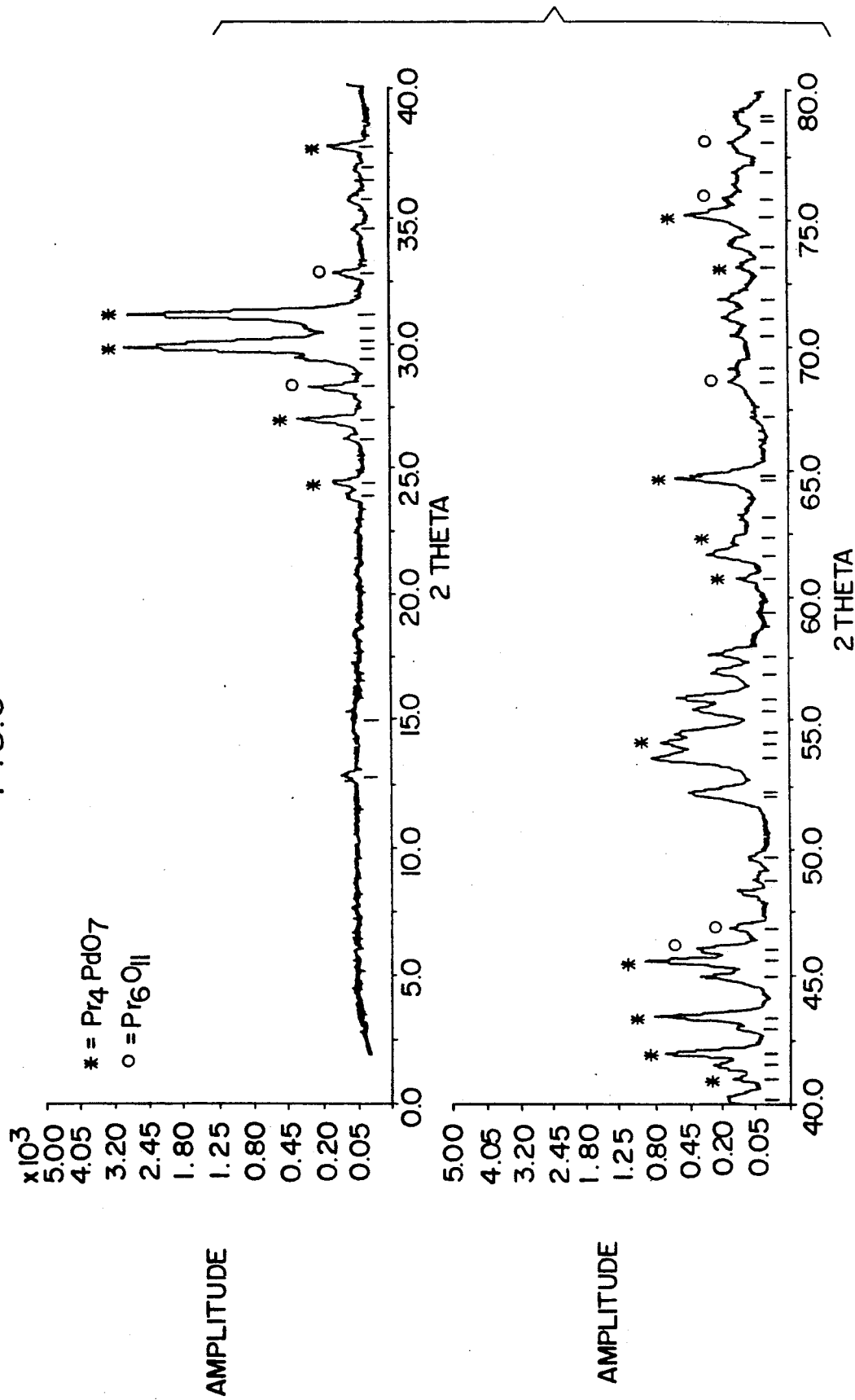

Preparation of the $Pr_4PdO_7$ compound can also be achieved by the solution-drying method. FIGS. 5 and 6 show the XRD spectra of the calcined samples which were produced by the solution-drying method of, respectively, Examples 3 and 4, the peaks characteristic of $Pr_4PdO_7$ being marked by asterisks.

Figure 7:
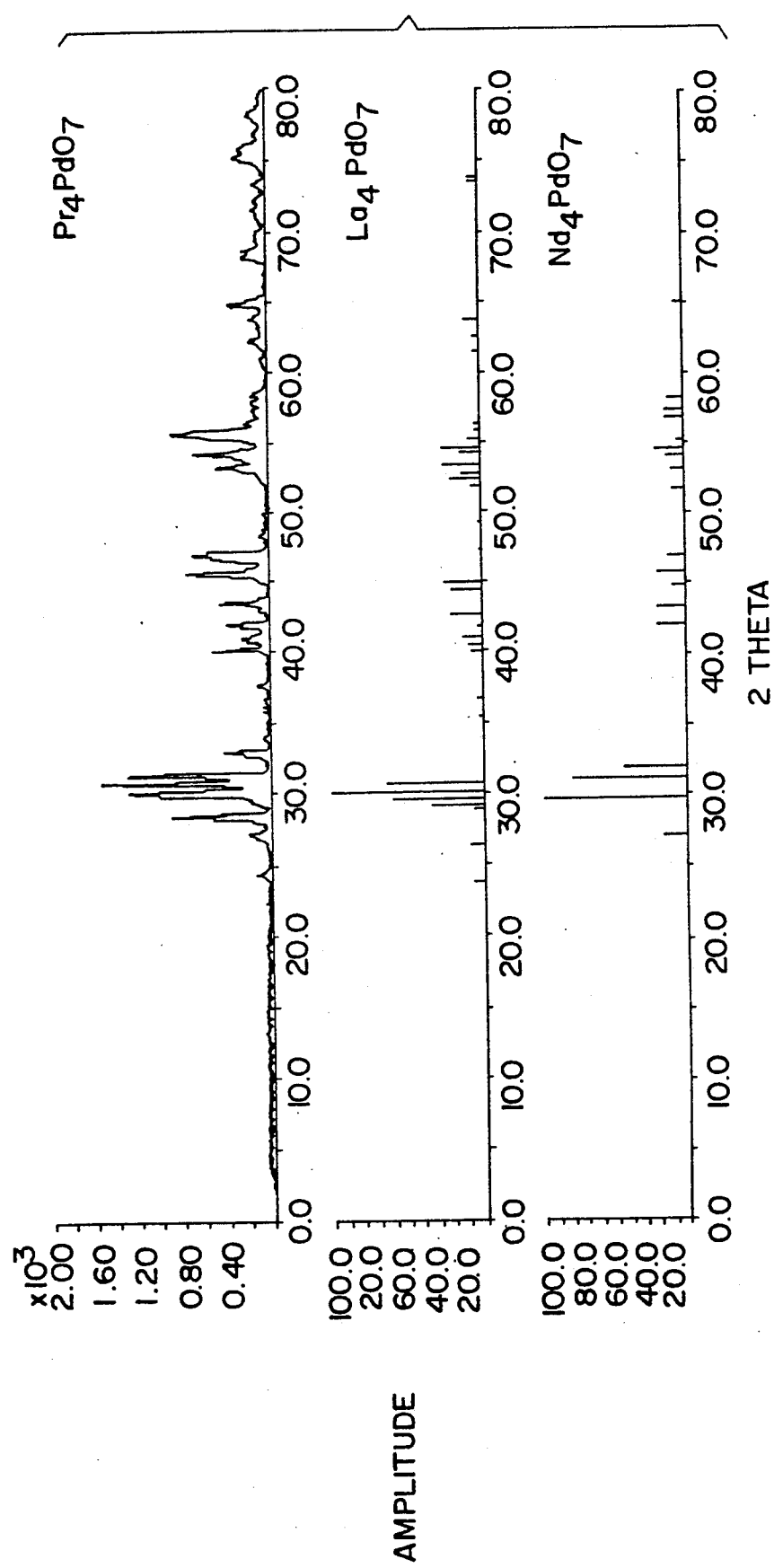

Although the crystalline structure of the new compound is yet to be fully investigated, it is believed that the new compound has a crystal structure similar to the known compounds $Nd_4PdO_7$ and $La_4PdO_7$. FIG. 7 shows a comparison of the XRD spectra of the compounds $Pr_4PdO_7$, $La_4PdO_7$ and $Nd_4PdO_7$. The major x-ray peaks of the compound $Pr_4PdO_7$ are seen to be basically aligned with those of the corresponding known La and Nd compounds.

Thermogravimetric analyses indicated that the new compound is thermally stable in air up to about 1220° C. and that, if heated to temperatures high enough to decompose the catalytically active binary oxide compound $Pr_4PdO_7$ (which results in formation of catalytically inactive species), will re-oxidize in air at temperatures less than 400° C. below the decomposition temperature, to regenerate the compound. This thermal stability, as well as the regenerative characteristics, and catalytic activity of the new compound for oxidation of carbonaceous gaseous fuels, makes the new compound and reaction mixtures containing it well suited for practical use in catalytic combustion processes for carbonaceous gaseous fuels.

The thermogravimetric procedure used to develop the data represented in FIGS. 8, 9 and 10 and partially summarized below in TABLE I was as follows. Thermogravimetric analysis refers to measuring small weight changes in a sample at different temperatures, such as the weight changes due to various chemical reactions undergone by the samples. A carefully weighed sample of 20 milligram ("mg") to 50 mg size is placed in a quartz pan which is suspended from a weight measuring device manufactured by Thermal Sciences, Model STA 1500. Air at approximately 20 $cm^3$/min is passed over the sample. A furnace gradually heats the sample at a rate of about 10° C./min to attain the temperatures shown on the abscissa of the graphs of FIGS. 8-10. The weight changes occasioned by the heating are plotted as the percentage of the starting weight of the sample on the lefthand ordinate of the Figures to show the weight losses which result from decomposition of the compound and consequent loss of oxygen. The heating was continued until a temperature of 1400° C. was attained and that temperature was held for about one minute. In addition to the weight changes, temperature changes caused by the heat of reaction (differential thermal analysis) of the sample as decomposition and then oxidation take place were monitored during the heating period. The heating was then discontinued to allow the heated sample to cool in air, and changes in weight and temperature changes caused by heats of reaction due to chemical and/or phase changes were monitored during the cooling period.

Figure 8:
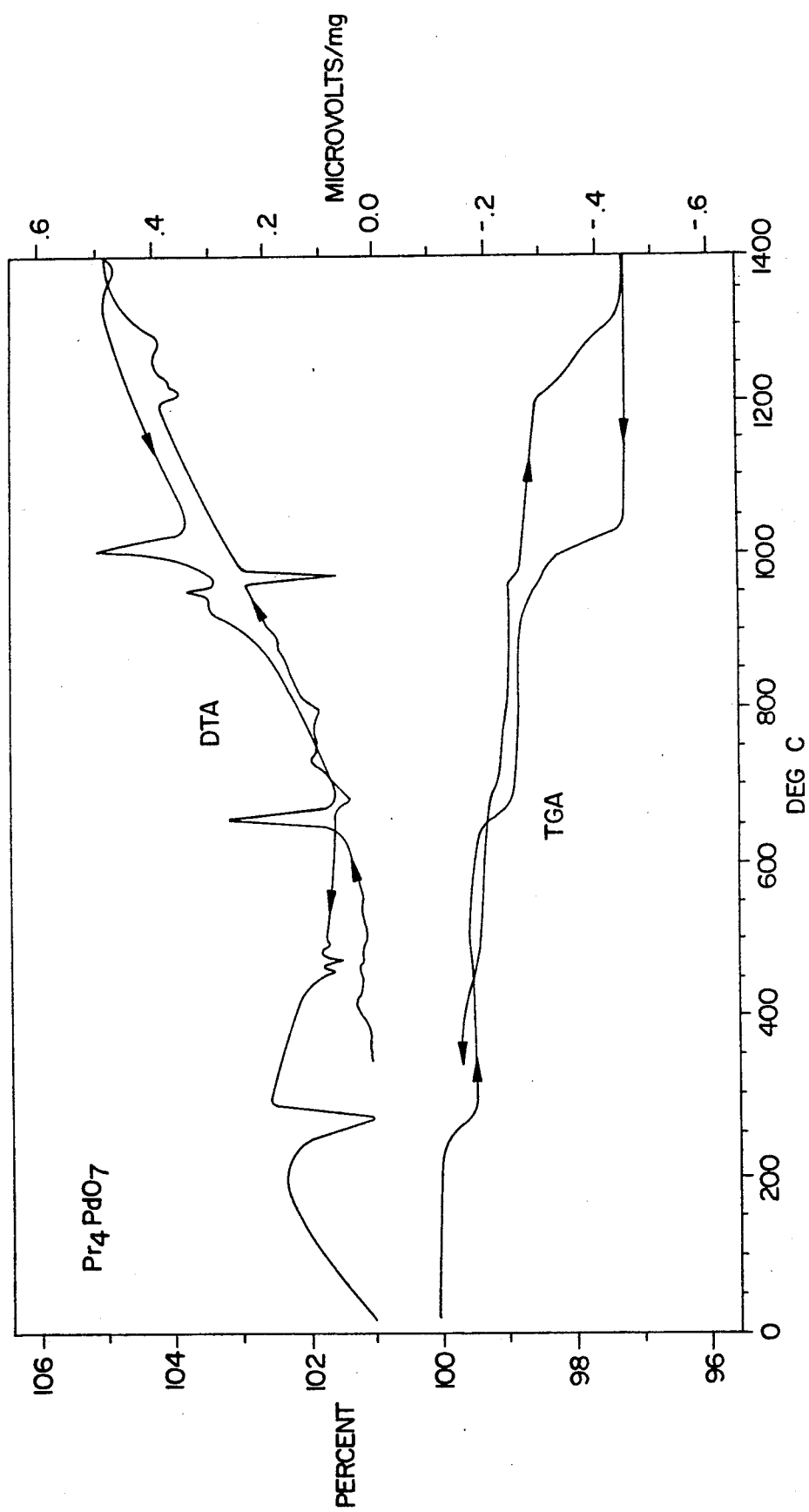
FIG. 8 is a plot of a thermogravimetric analysis ("TGA") in air of a sample of a reaction product containing the novel compound of the invention showing temperature versus sample weight, on which is superimposed a differential thermal analysis ("DTA") profile of the heat liberated or absorbed during chemical and phase transformations of the sample.

Referring now to FIG. 8, during the heating period of the thermogravimetric analysis program, identified on the plots as TGA with the heating period being indicated by the arrowheads directed rightwardly as viewed in FIG. 8 (and in FIGS. 9 and 10), a gradual loss in weight was recorded starting at about 350° C. with a small, sharp drop in weight at about 975° C., and a precipitous drop in weight from about 1225° C. to 1325° C. This shows a substantial decomposition of the $Pr_4PdO_7$ compound occurring between 1225° C. and 1325° C. with no further significant loss in weight upon heating to 1400° C. During the cooling period, which is indicated by leftwardly pointing arrowheads as viewed in FIG. 8 (and in FIGS. 9 and 10), the weight of the sample is seen to remain substantially constant in cooling from about 1400° C. to about 1050° C. with a rapid gain in weight as cooling continues from about 1050° C. to about 900° C. This gain in weight shows a nearly complete re-oxidation of the material has taken place by the time the sample has cooled to about 900° C. Although palladium oxides show catalytic activity for the thermal combustion reaction, palladium metal and praseodymium metal are substantially inactive for the reaction. Therefore, the nearly complete regeneration of the oxide species, and consequently, of catalytic activity, as indicated by the weight gain demonstrated in the cooling region from about 1038° C. to 900° C., especially 1030° C. to 1000° C., shows that the novel compound of the invention possesses excellent regeneration properties. Further cooling below 900° C. to about 650° C. showed only a slight weight gain, but a further more modest weight gain is noted in cooling down to about 350° C.

In contrast, the corresponding lanthanum and neodymium compounds, when subjected to the same heating and cooling cycle, showed very little regeneration ability. Thus, FIG. 9 shows that the binary lanthanum-palladium oxide underwent a precipitous loss in weight between about 325° C. to 500° C., at which point the weight remained more or less stable until a temperature of about 1250° C. was attained at which an additional significant weight loss was noted due to decomposition of the $La_4PdO_7$ compound, with the weight more or less stabilizing when heated between 1350° C. to 1400° C. However, upon cooling to about 440° C., the weight of the compound remained substantially the same, showing no significant re-oxidation. Similarly, FIG. 9 shows a significant weight loss of the corresponding binary neodymium-palladium oxide occurring in the 300° C. to 450° C. range, substantially stable weight until about 1200° C., with a further substantial weight loss due to dissociation of $Nd_4PdO_7$ in the temperature range of 1200° C. to 1300° C., after which the weight stabilized upon heating up to 1400° C. However, upon cooling to about 400° C., the weight remained substantially the same, showing very little re-oxidation to reform the binary oxide compound.

Superimposed on the TGA plots are differential thermal analysis temperature profiles, identified as DTA on the plots and measured in microvolts per milligram by a Pt/Rh thermocouple showing the heats of reaction of the sample. The thermocouple readings are shown on the righthand ordinate of the plots of FIGS. 8, 9 and 10, with rightwardly directed arrowheads showing the temperature recorded during the heating period and leftwardly directed arrowheads showing the temperature recorded during the cooling period. The upwardly pointing peaks as shown in the plots are exotherms indicating an oxidation reaction and the downwardly pointing peaks are endotherms indicating decomposition of the oxide to the metals. It will be noted that these peaks coincide with the sample weight changes thereby confirming that the weight gains and losses are caused by, respectively, oxidation and decomposition of the sample.

The following TABLE shows selected data from FIGS. 8, 9 and 10.

TABLE I

Thermal Properties of $Pr_4PdO_7$, $Nd_4PdO_7$ and $La_4PdO_7$

| Primary Active Species in the Reaction Product | Td °C. | Tr °C. | Approximate Regeneration Weight Gain |
|---|---|---|---|
| $Pr_4PdO_7$ | 1220–1310 | 1038–1000 | 90% |
| $Nd_4PdO_7$ | 1230–1290 | 767–730 | 5% |
| $La_4PdO_7$ | 1300–1350 | 767–730 | 5% |

Td = decomposition temperature, i.e., temperature at which the binary oxide decomposes to the metals.
Tr = regeneration temperature, i.e., the temperature at which the metals re-oxidize to the binary oxide.

TABLE I shows selected data from FIGS. 8-10 comparing the decomposition temperatures of the indicated palladium-containing compounds, the regeneration (re-oxidation) of the compounds during the cooling cycle, and the approximate weight recoveries during regeneration. As noted above, all three compounds have somewhat similar decomposition temperature ranges. However, only the new compound $Pr_4PdO_7$ shows a recovery of about 90–95% of its weight during cooling, compared to only about a 5% recovery for the corresponding Nd and La compounds. Furthermore, the large weight gain for the new compound occurs during cooling in air between 1038° C. and 1000° C. while the extremely limited regeneration of the other two compounds does not take place until cooling between about 767° C. and 730° C. For all three compounds, the regeneration of the oxide signaled by the regaining of weight, provides the active catalytic material. It is seen that about 90% by weight of the catalytically active praseodymium compound of the invention is regenerated whereas only about 5% by weight of the catalytically active lanthanum and neodymium compounds are regenerated. Further, the regeneration of the praseodymium binary compound occurs at a more desirable significantly higher temperature than the very limited regeneration of the other two compounds. This phenomenon is believed due to more rapid exchange of $O_2$ in formation of the new compound.

The striking regenerative capacity of the binary oxide $Pr_4PdO_7$ of the invention provides a great advantage over other binary oxides such as the corresponding La and Nd compounds. For example, upset conditions often occur in catalytic combustion operations resulting in an over-temperature condition existing in the catalyst zone for a time sufficient to decompose all or some of the palladium-rare earth metal catalyst and thereby inactivate, or reduce the activity of, the catalyst. Even if the entire catalyst is not over-temperatured to deactivation, local hot-spots can occur which cause deactivation of parts of the catalyst, resulting in lowered catalytic activity. If such deactivation were to occur with a catalyst composition whose catalytically active component was $La_4PdO_7$, $Nd_4PdO_7$ or some other binary palladium-rare earth metal oxide whose regenerative capacity was similarly severely limited, the catalyst would have to be replaced, thereby incurring considerable cost for the replacement catalyst, labor and downtime of the combustion equipment. In contrast, the catalyst of the invention could be regenerated to a high level of catalytic activity simply by operating the combustion process at a lower temperature, e.g., about 600° C. to 1050° C. The combustion mixture, containing as it does 95 to 99 volume percent air, provides ample oxygen to regenerate the catalyst during a relatively low temperature "heat soak" operation. Thus low-temperature combustion or any other suitable technique to contact the catalyst with a gas containing oxygen (usually air) at a temperature within the regeneration temperature range of the catalyst may be used to provide efficient and low-cost in situ regeneration of the catalyst of the present invention.

Catalytic activity of the $Pr_4PdO_7$ compound for methane combustion is shown in the following Example 5.

EXAMPLE 5

A gas mixture comprised of 1% by volume $CH_4$ and the balance air was passed over a catalyst bed comprised of 0.06 g of the binary oxide catalysts of TABLE II in powder form mixed with 2.94 g of a diluent alpha alumina powder. The catalyst and diluent powders had a particle size range between 53 and 150 microns in diameter. The gas mixture flow rate through the bed was 1.5 liters/min. A thermocouple was positioned in the bed to record its temperature. A furnace externally heated the bed and a Beckmann Industrial Model 400A Hydrocarbon Analyzer monitored the conversion of $CH_4$ as a function of temperature. The temperature at which 30% conversion of $CH_4$ was attained is given is in TABLE II below for a number of Pd-containing compounds used as the catalyst.

TABLE II

| Primary Active Species in the Reaction Product | Temperature (°C.) For 30% Conversion of $CH_4$ |
|---|---|
| $Pr_4PdO_7$ | 610 |
| $Nd_4PdO_7$ | 640 |
| $La_4PdO_7$ | 630 |

The behavior of the $Pr_4PdO_7$ binary oxide catalyst is quite similar to the corresponding Nd and La binary oxide catalysts insofar as catalytic activity is concerned, as indicated by the temperature required by each for 30% conversion of $CH_4$. Thus, the methane combustion activity of the $Pr_4PdO_7$-containing reaction mixture of the invention is comparable to those of the $Nd_4PdO_7$ and $La_4PdO_7$ compounds. The catalytically active reaction product listed in TABLE II as primarily containing $Pr_4PdO_7$ as the catalytically active species contains other materials including small amounts of other oxides such as $PrO_2$, $Pr_6O_{11}$ and PdO. However, the reported catalytic activity is overwhelmingly if not entirely due to the $Pr_4PdO_7$ compound. The compounds $PrO_2$ and $Pr_6O_{11}$ have no catalytic activity for the combustion of carbonaceous fuels. As to PdO, although it is an excellent catalyst for that reaction, it is active at much lower temperatures (as low as about 271° C.; for example, PdO shows significant catalytic activity for combustion of gaseous carbonaceous fuels at, e.g., 300° C.). Inasmuch as TABLE II shows that the reaction product containing the $Pr_4PdO_7$ compound does not demonstrate significant catalytic activity for the combustion reaction (30% activity) until a temperature of about 610° C. is attained, it is clear that very little PdO is present. Based on the weight losses observed in the thermogravimetric analysis of the samples, it is estimated that the $Pr_4PdO_7$ compound comprises about 20 weight percent of the solid reaction products obtained in the illustrated preparations of the compound of the present invention. In view of the good thermal stability and catalytic properties for, e.g., natural gas or methane combustion, the new compound can be used as a high temperature catalyst for catalytic thermal combustion applications. Further, the vastly superior regenerative properties of the $Pr_4PdO_7$ compound of the invention as compared to corresponding La and Nd binary oxides provide a significant advantage in case of accidental over-temperature operation, which often occurs in practice during catalytic combustion operations.

EXAMPLE 6

The catalytic activity for methane combustion of the catalyst of Example 2 was measured. The reaction product obtained in Example 2 (comprising $Pr_4PdO_7$ and other oxides as described) was admixed with gamma alumina to give a mixture comprising 7 weight percent of the reaction product obtained from Example 2 and 93 weight percent alumina. A slurry was made of 50 weight percent of the above material in water with an amount of acetic acid equal to 5% of the solids content. A cordierite honeycomb with 400 cells (gas flow passages) per square inch and measuring one inch (2.54 cm) in diameter and ½ inch (1.27 cm) in length was dipped into the slurry. An air knife was used to clear the channels of excess slurry. The washcoated honeycomb was dried 16 hours at 110° C. and then calcined at 500° C. in air, for 2 hours to give the finished catalyst which exhibited a dry weight increase of about 1.5 g per cubic inch of honeycomb catalyst. This weight increase is the weight of the washcoat of catalyst plus alumina binder-diluent. This is a relatively small content of catalytically active material which, however, proved to be quite active. The resulting catalyst body was fixed in place in a reactor tube in order to test the catalyst to determine its activity. The test was run to determine the temperature required to sustain 20% combustion of a 1 volume percent $CH_4$ in air gas stream fed at 20 liters per minute at about ambient pressure ($\cong 15$ psi) through the catalyst. This catalyst required a temperature of 535° C. to attain 20% combustion while an otherwise identical honeycomb carrier without the catalytic material washcoat needed a temperature of 716° C. to achieve the same level of methane conversion.

Thus, the compounds of this invention may be used to catalyze combustion of a combustion mixture of oxygen, e.g., air, and a gaseous carbonaceous fuel, including fuels containing methane, without significant formation of NOx. Such combustion of the gaseous carbonaceous fuel is carried out by methods known in the prior art as illustrated in, for example, U.S. Pat. No. 3,928,961 issued Dec. 30, 1975 to William C. Pfefferle. This Patent discloses such a method and apparatus for carrying out the method. FIG. 4 of the Pfefferle Patent and the description at column 10, lines 29-49, disclose a system in which a fuel-air combustion mixtu is introduced into a catalyst zone 34 which may be sized to provide for combustion of only a minor portion of the fuel therein, with the major portion of the fuel being combusted by thermal combustion in a combustion zone 37 located downstream of the catalyst 34 and of larger volume than the catalyst 34. In this way combustion is initiated within a catalyst but, the majority of the combustion takes place as thermal combustion in a zone downstream of the catalyst.

As explained in the aforesaid Pfefferle Patent, conventional, i.e., noncatalytic, thermal combustion systems of the type used for engines and power plants, such as gas turbines, operate at combustion temperature which are high enough to form nitrogen oxides ("NOx") including NO. This is because spark-ignited flammable mixtures of fuels such as natural gas and methane combust at temperatures of about 3300° F. or higher, which results in the formation of substantial amounts of NOx from atmospheric nitrogen. Catalytic combustion has the advantage of occurring at lower temperatures in which the formation of NOx is avoided or greatly reduced. However, because of limitations on the rate of mass transfer of the fuel and oxygen to the catalyst surface, either a prohibitively large surface area of catalyst must be provided or the mass transfer rate must be increased to such an extent that an excessively high pressure drop across the catalyst will be sustained. The Pfefferle Patent overcomes these difficulties by employing catalytically supported thermal combustion, based on the finding that if the operating temperature of the catalyst is increased substantially into the mass transfer limited region of operation the reaction rate begins to increase exponentially. Pfefferle theorized that the phenomenon may be explained by the fact that the catalyst surface and the gas layer near the catalyst surface are above a temperature at which thermal combustion occurs at a rate higher than the catalytic rate, and the temperature of the catalyst surface is above the instantaneous auto-ignition temperature of the fuel-air admixture. As a result, the fuel molecules entering this high temperature layer spontaneously burn without necessity of their being transported to the catalyst surface. As the combustion process proceeds, this high temperature gas layer becomes deeper until substantially the entire gas flow stream of the combustion mixture is ultimately raised to a temperature at which thermal combustion reactions occur. Consequently, the thermal combustion takes place throughout the entire gas stream, not merely adjacent the catalyst layer. The "instantaneous auto-ignition temperature" as defined by Pfefferle means that temperature at which the ignition lag of the fuel-air mixture entering the catalyst is negligible relative to the residence time in the combustion zone of the mixture undergoing combustion.

The Patent literature shows numerous further developments and modifications of the basic system disclosed by Pfefferle, including William C. Pfefferle U.S. Pat. Nos. 3,940,923, 3,846,979, 3,975,900, and 4,094,142. In such a method, an intimate mixture of the fuel and air is formed and contacted in a combustion zone with a catalyst composition comprising the novel compound of this invention. Combustion of at least a portion of the fuel is thereby attained under essentially adiabatic conditions at a rate surmounting the mass transfer limitation to form an effluent of high thermal energy. The combustion zone may be maintained at a temperature of from about 925° C. to about 1650° C. and the combustion is generally carried out at a pressure of from 1 to 20 atmospheres. Configuration of the catalyst to employ the catalyst of the present invention in a zone which, during normal operation is exposed to temperatures which do not exceed about 950° C. will preclude significant deactivation of the catalyst during normal operation. Operating upsets which raise the temperature to levels, e.g., over 1050° C., at which the $Pr_4PdO_7$ compounds decompose, thereby inactivating the catalyst, may be rectified by cooling the catalyst to below about 950° C., e.g., to a temperature within the range 800° C. to 900° C., thereby re-oxidizing the compound and regenerating the catalyst.

The combustion catalyst of this invention may be used in a segmented catalyst bed such as described in, for example, U.S. Pat. No. 4,089,654. Dividing the catalyst configuration into upstream and downstream segments is beneficial not only from an operational standpoint, but also in terms of monitoring the performance of various sections of the bed.

The catalyst composition may comprise a carrier or substrate such as a unitary structure comprising a ceramic body having a plurality of fine, parallel gas flow passages extending therethrough, from an inlet face to an outlet face thereof, the thin walls of the passages being coated with a "washcoat" comprised of a catalytic material containing a binary praseodymium-palladium oxide in accordance with the present invention. The carrier or substrate may be cylindrical in configuration, and usually is of circular or oval cross section with the inlet and outlet faces disposed perpendicularly to gas flow passages and the longitudinal axis of the cylinder. Such carriers are sometimes referred to as honeycomb or monolith carriers and may be made of any suitable refractory material such as cordierite, mullite or other ceramic-like materials which are extruded into the honeycomb body. Alternatively, a metal such as alternate layers of flat and corrugated stainless steel may be rolled into a honeycomb structure or the honeycomb may be made from ceramic precursor fibers wound upon a mandrel and fired to provide the honeycomb body. The flow channels in the resultant honeycomb structures may be of any desired cross section such as square, rectangular, triangular or hexagonal. The number of channels per square inch varies depending upon the particular application, and monolithic honeycombs are commercially available having anywhere from about 9 to 600 channels per square inch. The substrate or carrier portion of the honeycomb desirably is porous, but may be nonporous as in the case of metal substrates, and is catalytically relatively or completely inert to the oxidation reaction.

The binary praseodymium-palladium oxide compound of this invention, alone or mixed with other materials (such as by using as the catalytic material the reaction product of Examples 1, 2, 3 or 4) may be mixed with a suitable refractory metal oxide binder to provide a catalytic material washcoat which firmly adheres to the walls of the gas flow passages of a honeycomb type or other carrier. A suitable binder material may be, e.g., alumina or silica. The binder also serves as a diluent for the catalytic material. Typically, a washcoat may contain from about 80 to 99 weight percent of a diluent-binder and from about 20 to 1 weight percent of catalyst comprising the binary oxide of the invention. The catalyst itself may comprise the novel $Pr_4PdO_7$ binary oxide compound alone, or it may comprise a mixture of materials containing, e.g., praseodymium oxides, palladium oxides, palladium and praseodymium metal and/or other binary praseodymium-palladium oxides. Preferably, at least about 20 weight percent of the catalyst itself comprises $Pr_4PdO_7$.

As those skilled in the art will appreciate, the decomposition and regeneration temperature ranges of the palladium-praseodymium binary oxide are dependent on the partial pressure of oxygen, and at higher pressures, as for example might be encountered in conjunction with generation of combustion effluent useful for operation of gas turbines, the decomposition temperature at which the binary oxide will decompose into catalytically inactive species will increase, as will the regeneration temperature at which the binary oxide will re-form. References to these decomposition and regeneration temperatures are all at atmospheric pressures, it being understood that at enhanced partial pressure of oxygen the decomposition and regenerating temperatures will shift upwardly. The determination of such increased temperatures at higher oxygen partial pressures will be a matter well known to those skilled in the art. The demonstrated catalytic activity of the catalyst of the present invention, coupled with its thermal stability and good regenerative properties make it good candidate for high temperature zones of catalytic combustors of the type described in the above-mentioned Pfefferle U.S. Pat. No. 3,928,961 and Farrauto U.S. Pat. No. 4,893,465.

What is claimed is:

1. A compound of the formula $Pr_4PdO_7$.

2. A catalyst composition comprising a refractory carrier on which is disposed a catalytic material comprising a mixture of a refractory inorganic binder and a catalytically effective amount of a binary oxide having the formula $Pr_4PdO_7$.

3. The catalyst composition of claim 2 wherein the binary oxide compound is contained in a reaction product obtained by heating a mixture of praseodymium oxide and palladium oxide to an elevated temperature for a time sufficient to react the oxides to form said compound.

4. A catalyst composition comprising a refractory carrier on which is disposed a catalytic material comprising a mixture of a refractory inorganic binder and a catalytically effective amount of a reaction product obtained by heating a mixture of praseodymium oxide and palladium oxide to an elevated temperature and for a time sufficient to react the oxides to form a binary oxide of praseodymium and palladium.

5. The catalyst composition of claim 4 wherein the binary oxide comprises $Pr_4PdO_7$.

6. The catalyst composition of claim 5 wherein the reaction product further comprises $PrO_2$, $Pr_6O_{11}$ and PdO.

7. The catalyst composition of any one of claim 2, 3, 4 or 5 wherein the binder is selected from the group consisting of one or more of silica, alumina, titania and zirconia.

8. The catalyst composition of any one of claims 2, 3, 4 or 5 wherein the binder comprises alumina.

9. The catalyst composition of claim 8 wherein said binary oxide comprises from about 1 to 20 weight percent of said catalytic material and said binder comprises from about 99 to 80 weight of said catalytic material.

10. The catalyst composition of any one of claims 2, 3, 4 or 5 in which the carrier is a body having a plurality of parallel gas flow passages extending therethrough, the passages being defined by walls on which the catalytic material is deposited as a washcoat.

* * * * *